United States Patent
Andersen et al.

(10) Patent No.: US 11,286,904 B2
(45) Date of Patent: Mar. 29, 2022

(54) METHOD OF CONTROLLING A WIND TURBINE GENERATOR

(71) Applicant: VESTAS WIND SYSTEMS A/S, Aarhus N (DK)

(72) Inventors: Gert Karmisholt Andersen, Hovedgård (DK); Lars Helle, Suldrup (DK); Poul Møhl Dyrlund, Lystrup (DK); Morteza Rabi, Århus C (DK); Duy Duc Doan, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/957,100

(22) PCT Filed: Dec. 5, 2018

(86) PCT No.: PCT/DK2018/050327
§ 371 (c)(1),
(2) Date: Jun. 22, 2020

(87) PCT Pub. No.: WO2019/120404
PCT Pub. Date: Jun. 27, 2019

(65) Prior Publication Data
US 2020/0392942 A1 Dec. 17, 2020

(30) Foreign Application Priority Data

Dec. 22, 2017 (DK) .......................... PA 2017 71021

(51) Int. Cl.
*F03D 9/00* (2016.01)
*H02P 9/04* (2006.01)
(Continued)

(52) U.S. Cl.
CPC ........... *F03D 7/0272* (2013.01); *F03D 7/028* (2013.01); *F03D 7/043* (2013.01); *F03D 9/25* (2016.05); *H02P 9/105* (2013.01); *F05B 2270/1033* (2013.01); *F05B 2270/303* (2013.01); *H02P 2101/15* (2015.01)

(58) Field of Classification Search
CPC ........ F03D 7/0272; F03D 7/028; F03D 7/043; F03D 9/25; H02P 9/105
See application file for complete search history.

(56) References Cited

U.S. PATENT DOCUMENTS 8,694,173 B2 * 4/2014 Lovmand ................ F03D 7/043
700/287
9,692,351 B2 * 6/2017 Enoki ..................... H02P 29/68
(Continued)

FOREIGN PATENT DOCUMENTS

EP 2309122 A1 4/2011
EP 2530816 A2 12/2012
(Continued)

OTHER PUBLICATIONS

PCT International Search Report, application: PCT/DK2018/050327 dated Jul. 2, 2018.
(Continued)

*Primary Examiner* — Tulsidas G Patel
*Assistant Examiner* — Thomas K Quigley
(74) *Attorney, Agent, or Firm* — Patterson + Sheridan, LLP

(57) ABSTRACT

A method for use in controlling a wind turbine generator of a wind power plant based on a condition of a power converter or a component forming part of a power converter in the wind power plant. The method comprises determining the initial condition of the power converter or a component forming part of a power converter and determining the evolution of the condition from the initial condition based on
(Continued)

notional power reference values of the wind turbine generator. The method further comprises comparing the evolution of the condition to a predetermined threshold and determining, from the comparison, a time period by which the condition of the power converter or a component forming part of a power converter will substantially equal the predetermined threshold.

10 Claims, 5 Drawing Sheets

(51) Int. Cl.
<table><tr><td>F03D 7/02</td><td>(2006.01)</td></tr><tr><td>F03D 9/25</td><td>(2016.01)</td></tr><tr><td>F03D 7/04</td><td>(2006.01)</td></tr><tr><td>H02P 9/10</td><td>(2006.01)</td></tr><tr><td>H02P 101/15</td><td>(2016.01)</td></tr></table>

(56) References Cited

U.S. PATENT DOCUMENTS

<table><tr><td>9,703,337 B2 *</td><td>7/2017</td><td>James</td><td>H02P 29/68</td></tr><tr><td>2009/0278351 A1</td><td>11/2009</td><td>Rivas et al.</td><td></td></tr><tr><td>2012/0029892 A1</td><td>2/2012</td><td>Thulke</td><td></td></tr><tr><td>2013/0317664 A1 *</td><td>11/2013</td><td>James</td><td>H02P 29/68<br>700/299</td></tr><tr><td>2015/0322926 A1 *</td><td>11/2015</td><td>Caponetti</td><td>F03D 7/028<br>416/1</td></tr></table>

FOREIGN PATENT DOCUMENTS

<table><tr><td>EP</td><td>2565442 A1</td><td>3/2013</td></tr><tr><td>EP</td><td>2948679 B1</td><td>12/2016</td></tr><tr><td>WO</td><td>2012019609</td><td>2/2012</td></tr><tr><td>WO</td><td>2014114295 A1</td><td>7/2014</td></tr><tr><td>WO</td><td>2017000955 A1</td><td>1/2017</td></tr><tr><td>WO</td><td>2019120404 A1</td><td>6/2019</td></tr></table>

OTHER PUBLICATIONS

PCT, Written Opinion of the International Searching Authority, Application: PCT/DK2018/050327, dated Jul. 2, 2018.

Danish Patent and Trademark Office, 1st Technical Examination of Patent Application: PA 2017 2017 71021 dated Jul. 2, 2018.

European Patent Office examination Report for Application No. 18 819 450.0-1007 dated Mar. 31, 2021.

* cited by examiner

METHOD OF CONTROLLING A WIND TURBINE GENERATOR

The present invention relates to a method for use in controlling of power converter in a wind turbine generator of a wind power plant.

BACKGROUND TO THE INVENTION

A wind turbine generator converts energy contained in wind into electrical power, which is typically delivered to a power grid. As the changeable nature of wind entails an electrical power output of varying characteristics, a power converter is also included to modify the variable frequency electrical power produced by the generator into a fixed frequency electrical power output that is more suitable for delivery to a power grid.

To this end, a converter controller is provided for adjusting the power converter output according to ambient wind conditions. The convertor controller may also be used to manage the generator in view of safety considerations and physical constraints in order to maintain cost-effective energy production by preventing component failure and minimising downtime.

It is against this background that the invention has been devised.

SUMMARY OF THE INVENTION

An aspect of the invention provides a method for use in controlling a wind turbine generator of a wind power plant based on a condition of a power converter or a component forming part of a power converter in the wind power plant. The method comprises determining the initial condition of the power converter or a component forming part of a power converter and determining the evolution of the condition from the initial condition based on notional power reference values of the wind turbine generator. The method further comprises comparing the evolution of the condition to a predetermined threshold and determining, from the comparison, a time period by which the condition of the power converter or a component forming part of a power converter will substantially equal the predetermined threshold. Preferably, the condition of the power converter is the temperature of the power converter or a component forming part of a power converter.

Preferably, the method further comprises determining, based on the power reference values, an active power limit and a reactive power limit. Preferably, the active power limit and the reactive power limit take the form of a P-Q chart.

Preferably, the method further comprises prioritising between active power and reactive power when determining the active power limit and the reactive power limit.

Preferably, the method further comprises controlling the wind turbine generator at the notional power reference values for a duration not exceeding the time period.

Preferably, the initial temperature and the temperature evolution are determined as a non-linear function based on the power loss of the power converter or a component forming part of a power converter at current operating parameters and an ambient temperature.

Preferably, the power loss of the power converter or a component forming part of a power converter is determined based on the voltage across the power converter and the current through the power converter. More preferably, the power loss of the power converter is the product of the voltage across the power converter and the current through the power converter. Each of these properties may be either directly measured or otherwise estimated.

Preferably, the method, when applied to a plurality of power converters, further comprises selecting, from a plurality of time periods, the shortest time period as the time period.

Preferably, the ambient temperature is a measurable temperature nearest to the power converter. That is, the ambient temperature is the temperature of an area surrounding the power converter so far as it is reasonably practicable to measure. This may include, for example, the ambient air temperature.

Preferably, the method further comprises comparing the initial condition of the power converter to the predetermined threshold and modifying the power reference values of the wind turbine generator if the condition substantially equals or exceeds the predetermined threshold. In particular, the step of modifying the current power reference values of the wind turbine generator comprises derating the parameters.

Another aspect of the invention provides controller for a wind turbine generator comprising a data processing means and a memory module, wherein the memory module comprises a set of program code instructions which when executed by the data processing means implement a method according to the first aspect of the invention.

Another aspect of the invention provides a computer program product downloadable from a communication network and/or stored on a machine readable medium comprising program code instructions for implementing a method according to the first aspect of the invention.

It will be appreciated that preferred and/or optional features of the first aspect of the invention may be incorporated alone or in appropriate combination in the second aspect of the invention also.

BRIEF DESCRIPTION OF THE DRAWINGS

The above and other aspects of the invention will now be described, by way of example only, with reference to the following drawings, in which.

In the drawings, like parts are denoted by like reference signs.

DETAILED DESCRIPTION OF EMBODIMENTS OF THE INVENTION

Figure 1:
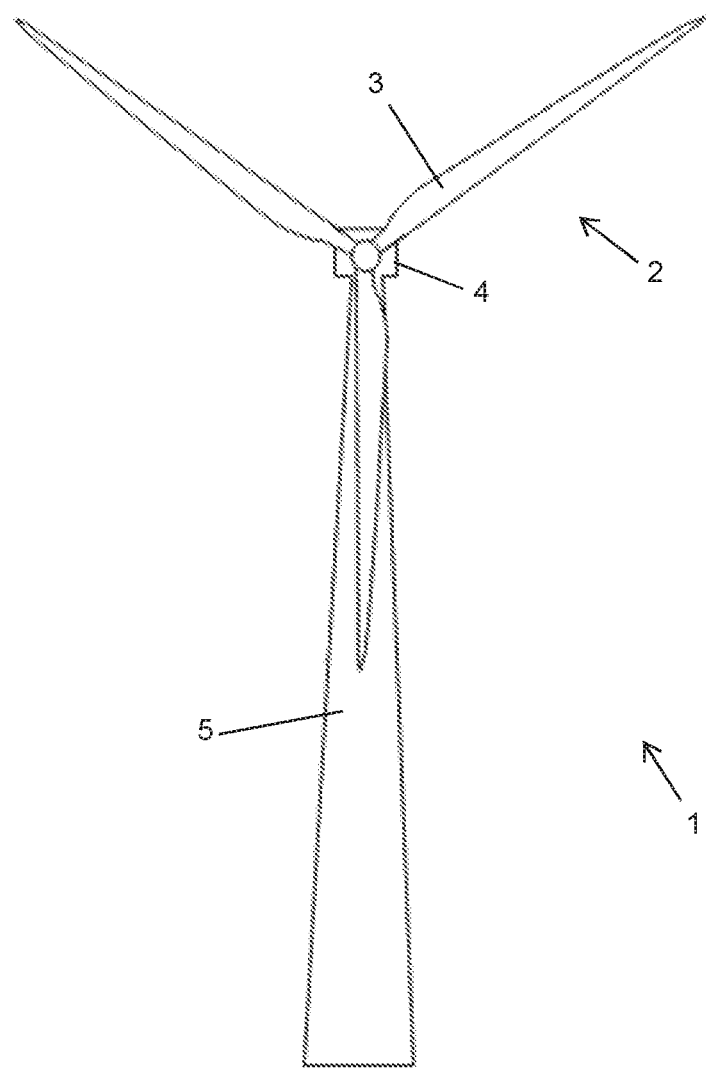
FIG. 1 is a schematic diagram of a wind turbine generator that is suitable for use with embodiments of the invention.

To provide context for the invention, FIG. 1 shows an individual wind turbine generator 1 of a kind that may be controlled according to embodiments of the invention. It should be appreciated that the wind turbine generator 1 of FIG. 1 is referred to here by way of example only, and it would be possible to implement embodiments of the invention into many different types of wind turbine systems.

The wind turbine generator 1 shown is a three-bladed upwind horizontal-axis wind turbine (HAWT), which is the most common type of turbine in use. The wind turbine generator 1 comprises a turbine rotor 2 having three blades 3, the rotor 2 being supported at the front of a nacelle 4 in the usual way. It is noted that although three blades is common, different numbers of blades may be used in alternative embodiments. The nacelle 4 is in turn mounted at the top of a support tower 5, which is secured to a foundation (not shown) that is embedded in the ground.

The nacelle 4 contains a generator (not shown in FIG. 1) that is driven by the rotor 2 to produce electrical energy. Thus, the wind turbine generator 1 is able to generate power from a flow of wind passing through the swept area of the rotor 2 causing the rotation of the blades 3.

Figure 2:
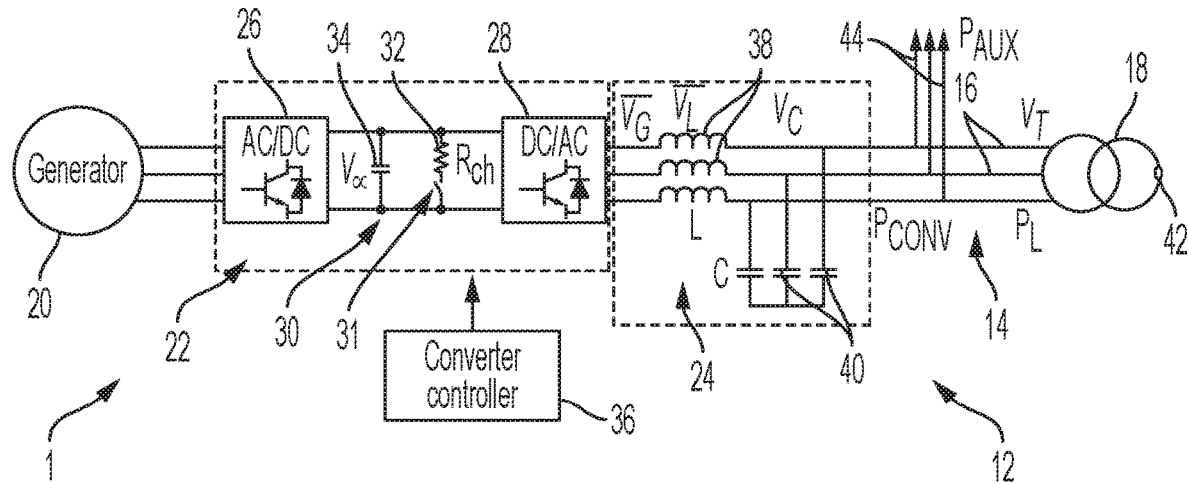
FIG. 2 is a schematic diagram of an architecture of a full-scale converter based wind power plant that is suitable for use with embodiments of the invention.

With reference now to FIG. 2, an example of a wind power plant 12 to which methods according to embodiments of the invention may be applied is shown. The example shown is representative only and the skilled reader will appreciate that the methods described below may be applicable to many different configurations. For example, although the example shown in FIG. 2 is based on a full-scale converter architecture, in practice the invention may be used with other types of converter and in general terms the invention is suitable for use with all topologies, such as DFIG arrangements.

Moreover, the power converter or components forming part of a power converter of the wind power plant 12 are conventional and as such familiar to the skilled reader, and so will only be described in overview.

The wind power plant 12 shown in FIG. 2 includes a single wind turbine generator 1 such as that shown in FIG. 1, but in practice further wind turbine generators may be included.

As already noted, the wind turbine generator 1 comprises an electrical generator 20 that is driven by a rotor (not shown in FIG. 2) to produce electrical power. The wind turbine generator 1 includes a low voltage link 14 defined by a bundle of low voltage lines 16 terminating at a coupling transformer 18, which acts as a terminal that connects the wind turbine generator 1 to a grid transmission line that in turn connects to a power grid. Electrical power produced by the wind turbine generator 1 is delivered to the grid through the coupling transformer 18.

The power produced in the electrical generator 20 is three-phase AC, but is not in a form suitable for delivery to the grid, in particular because it is typically not at the correct frequency or phase angle. Accordingly, the wind turbine generator 1 includes a power converter 22 and a filter 24 disposed between the electrical generator 20 and the coupling transformer 18 to process the electrical generator 20 output into a suitable waveform having the same frequency as the grid and the appropriate phase angle.

The power converter 22 provides AC to AC conversion by feeding electrical current through an AC-DC converter 26 followed by a DC-AC converter 28 in series. The AC-DC converter 26 is connected to the DC-AC converter 28 by a conventional DC link 30, which includes a switch 31 in series with a resistor 32 to act as a dump load to enable excess energy to be discharged, and a capacitor 34 providing smoothing for the DC output.

Any suitable power converter 22 may be used. In this embodiment, the AC-DC and DC-AC parts of the power converter 22 are defined by respective bridges of switching devices (not shown), for example in the configuration of a conventional two level back-to-back converter. Suitable switching devices for this purpose include integrated gate bipolar transistors (IGBTs) or metal-oxide-semiconductor field-effect transistors (MOSFETs). The switching devices are typically operated using pulse-width modulated drive signals.

The smoothed DC output of the AC-DC converter 26 is received as a DC input by the DC-AC converter 28 and creates a three-phase AC output for delivery to the coupling transformer 18.

As noted above, in a full-scale architecture the DC-AC converter 28 is configured to provide a level of control over the characteristics of the AC power produced, for example to increase the relative reactive power in dependence on grid demand. Noting that the magnitude, angle and frequency of the output is dictated by grid requirements, and that the voltage is set at a constant level in accordance with the specifications of the low voltage link 14, in practice only the current of the AC output is controlled, and a converter controller 36 is provided for this purpose. The converter controller 36 forms part of an overall control system that controls operation of the wind power plant 12, and is described in more detail later with reference to FIG. 3.

The control system acts based on sample data obtained by a sampling system that probes the wind turbine generator 1 at various stages to sample electrical signals that are indicative of current and/or voltage, for example. In particular, as is typical for a full-scale architecture, the sampling system gathers raw data relating to the current and voltage of the outputs from the stator 23 of the generator 20, and from the power converter 22 on the grid side. This raw data is processed into sample data, which is then passed to the converter controller 36, for example. The converter controller 36 uses the sample data to determine operating parameters for the wind turbine generator 1. For example, the duty cycle of the control signals for generator-side IGBTs of the power converter 22 may be determined, at least in part, based on the instantaneous properties of the generated power supplied by the electrical generator 20.

The AC output leaves the power converter 22 through the three power lines 16, one carrying each phase, which together define the low voltage link 14. The low voltage link 14 includes the filter 24, which in this embodiment comprises a respective inductor 38 with a respective shunted filter capacitor 40 for each of the three power lines 16, to provide low-pass filtering for removing switching harmonics from the AC waveform.

The three power lines 16 may also each include a respective circuit breaker (not shown) for managing faults within the wind power plant 12.

As noted above, the low voltage link 14 terminates at the coupling transformer 18, which provides a required step-up in voltage. A high voltage output from the coupling transformer 18 defines a wind turbine generator terminal 42, which acts as a point of common coupling for the wind power plant 12.

The low voltage link 14 also includes three branches, one for each phase, that define auxiliary power lines 44 that divert some of the power that is output from the filter 24 for powering auxiliary systems of the wind power plant 12 such as, for example, yaw, pitch and cooling systems.

As some of the power that is output from the power converter 22, or $P_{CONV}$, is diverted to provide power for auxiliary systems, or $P_{AUX}$, it follows that $P_{CONV}$ is greater than the power that is delivered to the grid, or 'line power' $P_L$.

The converter controller 36 may be configured to prioritise the various power references that it receives and correspondingly adjust the total power reference according to which the power converter 22 is controlled.

For example, if the total demanded power, namely the total grid demand, $P_L$, combined with the total demand for powering auxiliary systems, $P_{AUX}$, is greater than the total power that the wind power plant 12 is capable of producing with respect to ambient temperature and wind conditions, $P_{CONV}$, demand will not be met somewhere in the system. In this situation, the converter controller 36 may control the power converter 22 in accordance with a list of prioritised power references to ensure that the total grid demand is met. Alternatively, the total grid demand may be sacrificed in favour of the total demand for powering auxiliary systems.

Figure 3:
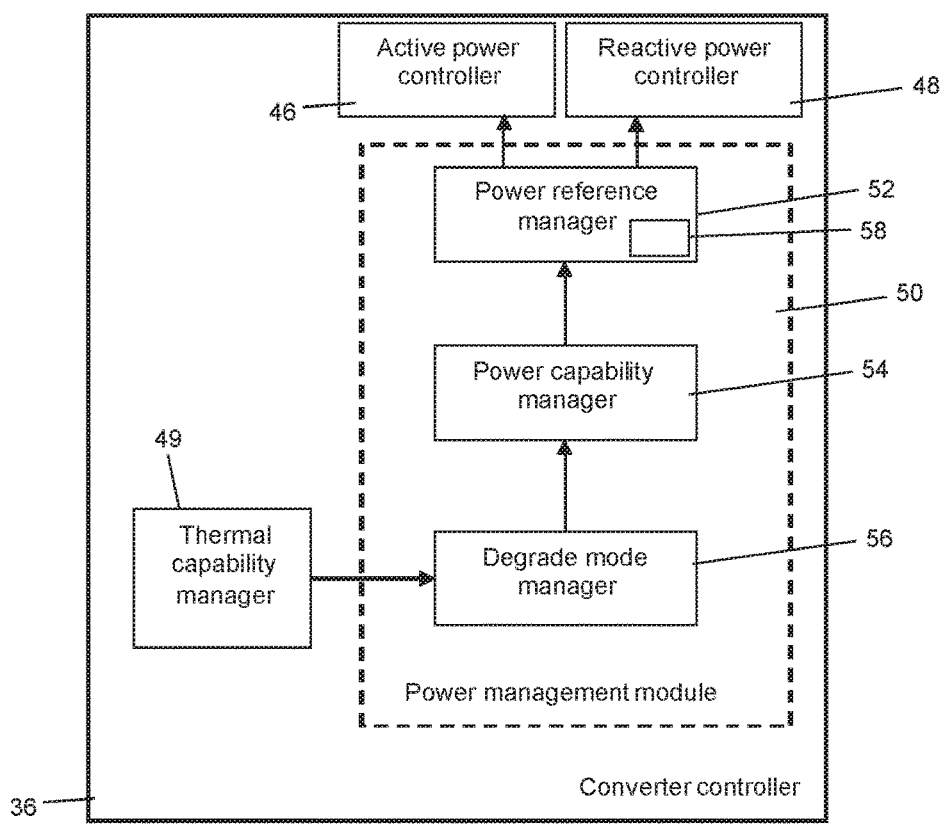
FIG. 3 is a block diagram representation of a convertor controller of the convertor in FIG. 2.

As FIG. 3 shows, the converter controller 36 of this embodiment comprises an active power controller 46, a reactive power controller 48, a software block defining a power management module 50 and a thermal capability manager 49. The skilled reader will appreciate that in practice the converter controller 36 may include various other control modules, but for the purposes of the present disclosure only those that relate to power control are referred to.

The active power controller 46 and the reactive power controller 48 operate in tandem to interface to current controllers (not shown), which issue drive signals to the switching devices of the power converter 22 to control the active and reactive components of its AC output based on signals received from the active and reactive power controllers 46, 48. The active power controller 46 is configured to receive an active power reference from the power management module 50, and the reactive power manager 48 is configured to receive a reactive power reference from the power management module 50.

The power management module 50 provides a suite of functions that enable the processing and optimisation of power references that arise within the wind power plant 12, and those received from external sources such as a transmission system operator responsible for the grid, a power plant controller responsible for multiple wind turbine generators within a single wind power plant, or a turbine controller, for example.

The power management module 50 is modularised, in that it comprises a set of discrete modules that each provide a specific function. In this embodiment, those modules are implemented as individual software blocks within a common processing unit, but in other arrangements dedicated hardware modules could be used.

The modularised arrangement enhances integration with the converter controller 36, in particular because it enables individual functions to be developed and upgraded without impacting other functions. Moreover, a clearly defined hierarchy between the different functions can be created, thus improving interaction between the functions and therefore improving the efficiency of the converter controller 36.

More specifically, in this embodiment the power management module 50 includes a power reference manager 52, a power capability manager 54, and a degrade mode manger 56. These modules are ordered according to a hierarchy in which the degrade mode manager 56 provides inputs to the power capability manager 54, which in turn provides inputs to the power reference manager 52, which then transmits an active power reference and a reactive power reference to the active power controller 46 and the reactive power controller 48, respectively.

The degrade mode manager 56 is arranged to degrade, or de-rate, the power generating capability of the generator 20 based on instantaneous operating parameters. For example, the generating capability of the generator 20 may be degraded if the temperature of a coolant system of the wind turbine generator 1 is higher than it should be, or if a module within the power converter 22 develops a fault.

The degrade mode manager 56 therefore relates to the level of power that the wind turbine generator 1 is able to produce at a fundamental level, in view of either safety considerations or physical constraints.

To this end, the degrade mode manager 56 is also arranged to degrade the power generating capability of the generator 20 according to the temperature of at least one component of the wind power plant 12. For example, the power generating capability can be degraded if it is determined that the temperature of a component is close to or exceeds a predetermined threshold of the component, which could be an operating temperature limit or an overall temperature limit of the component. Temperatures exceeding the former limit could compromise the performance of the component, whereas temperatures exceeding the latter limit would put the component at risk of developing a fault and becoming a fire hazard. This means that the wind turbine generator 1 would need to be shut down in order for the component to be repaired or otherwise replaced, resulting in lost production time.

Some examples of components whose temperatures can be used to degrade the power generating capability of the generator 20 are as follows: the inductors 38; the AC-DC converter 26; the DC-AC converter 28; the switch 31; the resistor 32; a stator breaker (not shown) used in the generator 20; and, the respective circuit breakers (not shown) used in power lines 16. However, it will be apparent to those skilled in the art that this list of components is not exhaustive and that the temperature of other components of the wind power plant 12 could be used when determining whether to degrade the power generating capability of the generator 20.

The thermal capability manager 49 is arranged to calculate the temperature of components of a power converter and output a derate reference to the power management module 36 based on comparison between the calculated temperature and a predetermined threshold of the power converter or a component forming part of a power converter. The operation of thermal capability manager 49 is described below in more detail with a focus on a single component of the wind power plant 12. It will be apparent to the skilled person, however, that the thermal capability manager 49 is capable of calculating and carrying out a comparison of temperatures for multiple power converter or components forming part of a power converter simultaneously.

Figure 4:
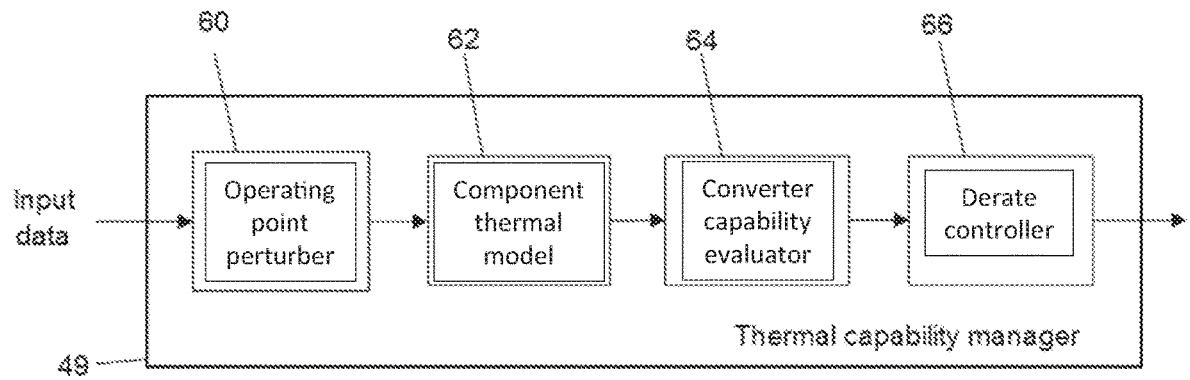
FIG. 4 is a block diagram of a thermal capability manager of the convertor controller of FIG. 3.

FIG. 4 shows the architecture of the thermal capability manager 49 in schematic form. The thermal capability manager 49 includes a series of modules that each provides a dedicated function, which process sample data received from the sampling system in a sequence of stages for the purpose of generating derate references that are passed to the power management module 52. The derate references limit the output of the generator 20 and the converter 22 in accordance with the estimated temperatures of power converter or a components forming part of a power converter of the wind power plant 12. It will be appreciated by those skilled in the art that the derate references can also be generated based on direct measurements of a component's temperature where available:

Specifically, the thermal capability manager 49 comprises four modules: an operating point perturber 60; a component thermal module 62; a converter capability evaluator 64; and, a derate controller 66. These modules may be embodied as software blocks, for example, or alternatively as dedicated hardware components. Although only one component thermal model 62 is shown for simplicity, in practice a respective component thermal model is included for each component that is to be monitored:

The operating point perturber 60 receives input data including the present active and reactive power references, and sample data indicating operating parameters such as voltage and current at various stages of the wind power plant 12, as well as ambient temperature.

Figure 5:
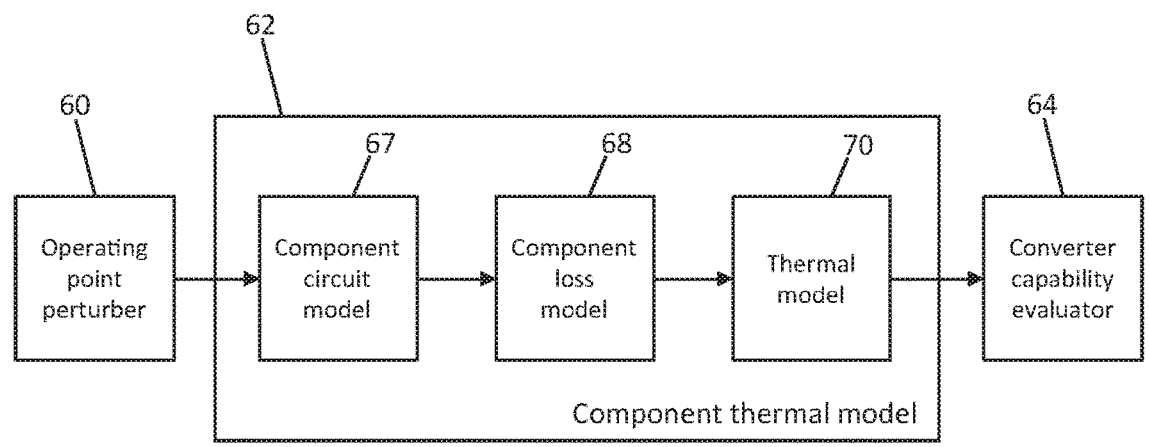
FIG. 5 is a block diagram of a component thermal model of the thermal capability manager of FIG. 4.

With reference to FIG. 5, the component thermal model 62 comprises three software blocks: a component circuit model 67; a component loss model 68; and, a thermal model 70.

The component circuit model 67 simulates the voltage across and the current thorough the component based on the input data received from the operating point perturber 60 relating to the present active and reactive power references.

Once the voltage and current have been determined, they are in turn used as inputs for a component loss model 68, which is configured to determine the associated power dissipated by the component. The dissipated power is then used, together with an ambient temperature of the component, as inputs for the thermal model 70, which estimates the current temperature of the component.

The ambient temperature in this instance is a measurable temperature nearest to the component. That is, the ambient temperature is an indication of the temperature of an area surrounding the component so far as it is reasonably practicable to measure. This may include, for example, the air temperature or the temperature of the cooling system in proximity of the component. The ambient temperature can be either estimated or measured using conventional methods or systems, all of which will be familiar to the skilled reader.

Figure 6:
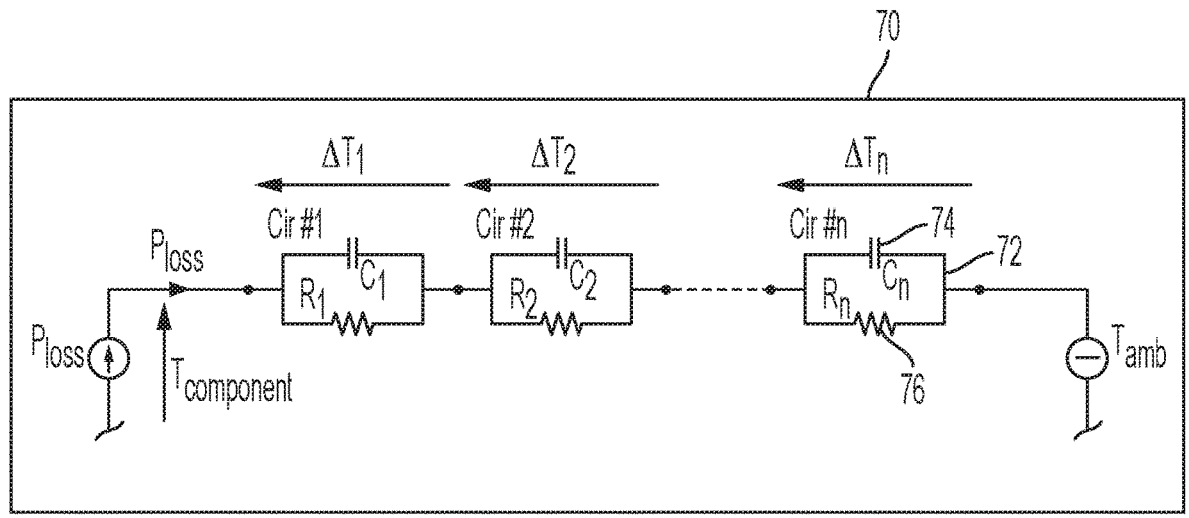
FIG. 6 is a thermal model of the component thermal model of FIG. 5.

FIG. 6 shows an example of a thermal model, generally designated by 70, for use in the component thermal model 62. The thermal model 70 is a high-order model comprising a plurality of Foster circuits 72 arranged in series. However, it will be apparent to the skilled reader than the thermal model 70 could also be implemented as a first, second, or higher-order model. In this example, the same heat flow, which is equivalent to the power loss determined using component loss model, passes through each Foster circuit 72. However, it will be apparent to the skilled reader that a component might be exposed to more than one heat flow where the same thermal model is shared between components. Each Foster circuit 72 comprises a capacitor 74 and a resistor 76 arranged in parallel, and the sum of the voltage drops across each part equals the temperature difference between the component temperature and the ambient temperature. This can be expressed simply as:

$$T_{component} = T_{amb} + \sum_{i=1}^{n} \Delta T_i$$

Each Foster circuit 72 is a first-order function, which can be described by a time constant and a gain (H):

$$H(s) \triangleq \frac{\sum_{i=1}^{n} \Delta T_i(s)}{P_{loss}(s)} = \sum_{i=1}^{n} R_i \frac{1}{\tau_1 s + 1}$$

Where, $\tau_i = R_i \cdot C_i$

The component temperature can then be estimated as:

$$T_{component}(s) = H(s) P_{loss}(s) + T_{amb}(s)$$

The output from the component thermal model 62 is passed to the converter capability evaluator 64, which compares the temperature of the component against a predetermined threshold.

The converter capability evaluator 64 outputs an indication as to whether the estimated temperature of the component substantially equals or exceeds the predetermined threshold to the derate controller 66. If it is determined that the estimated temperature of the component substantially equals or exceeds the predetermined threshold, the derate controller 66 generates respective derate factors for active power and reactive power accordingly. The derate factors are passed to the degrade mode manager 56 of the power management module 50, which uses them to update active and reactive power references that are used to control operation of the converter 22 and the generator 20. In the event the temperature of the component exceeds the predetermined threshold, the derate factors may be proportional to or non-linear with respect to the extent to which the threshold is surpassed.

The degrade mode manager 56 calculates degrade factors of between 0 and 1 that are applied globally throughout the system. In a simplified example, if the degrade mode manager 56 determines that the generator 20 is only capable of outputting half of its normal capacity in terms of active power due to an excessive component temperature, the degrade mode manager 56 calculates a degrade factor of 0.5 for active power.

In this respect, it is noted that as excessive component temperatures should be avoided, in this embodiment the derate factors that are calculated by the derate controller 66 define a maximum capability of the converter 22 and, in turn, the generator 20. Any other factors that might prompt further degradation, such as those mentioned below, are then applied within the parameters established by the derate factors. So, for example, if the derate factors are set at 0.8, the degrade mode manager will output a degrade factor in the range 0 to 0.8.

The degrade factors calculated by the degrade mode manager 56 are output to the power capability manager 54, which uses the factors to update a P-Q chart that defines the ratio of active power to reactive power that the wind turbine generator 1 is able to produce, as well as absolute magnitudes for each type of power. An example of a P-Q chart 80 that may be used by the converter controller 36 is shown in FIG. 7, which plots active power in kilowatts, on the x-axis, against reactive power in kilovolt-amperes reactive, on the y-axis.

A solid line 82 forming a trapezoidal shape represents the capability of the generator 20 when operating at normal capacity. The skilled reader will appreciate that this shape is typical for any P-Q chart for a generator 20 of a wind turbine generator. Within the solid line 82, a dashed line 84 forming a smaller trapezium represents a degraded capability for the generator 20.

Figure 7:
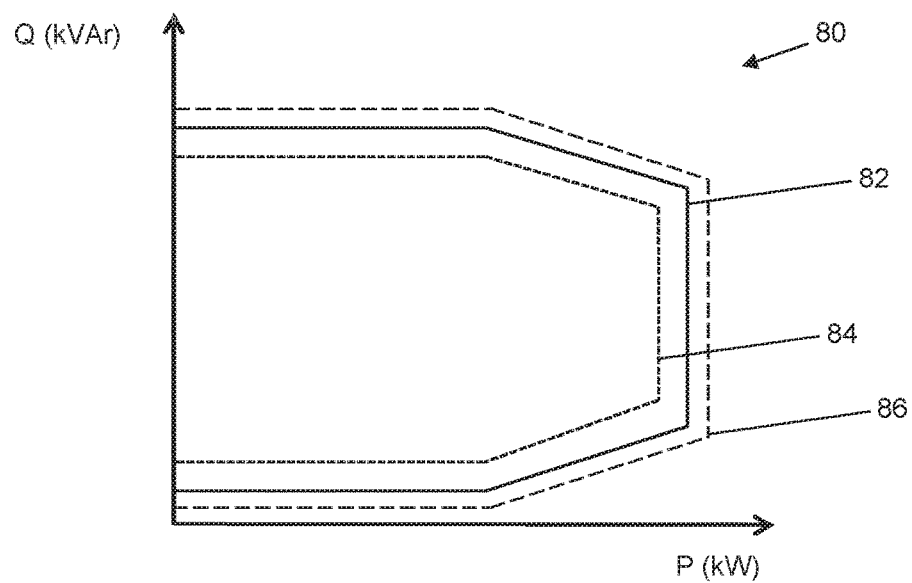
FIG. 7 is a representation of a typical P-Q chart used by the converter controller of FIG. 3.

It is noted that in the example shown in FIG. 7, both active and reactive power are degraded in the degraded capability represented by the dashed line 84, and each by equal amounts. However, in other operating modes only one of these may be degraded, or different weighting may be applied to each type of power. For example, if active power is prioritised over reactive power, reactive power is degraded to a greater extent than active power, and optionally only reactive power is degraded. Correspondingly, if reactive power is prioritised, active power is degraded to a greater extent than reactive power.

The lines shown on the P-Q chart 80 therefore define the long-term power generating capability of the wind turbine generator 1. The power capability manager 54 updates the P-Q chart 80 according to the degrade factors generated by the degrade mode manager 56, if those factors fall below 1.

The power capability manager 54 then generates active and reactive power limits by checking the updated P-Q chart 80 against a prioritisation of active power against reactive power, which is defined by an operating mode of the wind turbine generator 1 as indicated by the power plant controller or the turbine controller.

For example, if reactive power is prioritised, but a reactive power reference supplied by the power plant controller or the turbine controller cannot be met within the limits of the updated P-Q chart 80, the power capability manager 54 adjusts the active and reactive power limits accordingly by degrading the active power limit further to enable the reactive power demand to be met.

In turn, once the power capability manager 54 has updated the P-Q chart 80 in accordance with the degrade factor supplied by the degrade mode manager 56, and generated active and reactive power limits in accordance with the prioritisation between the two types of power, those power limits are communicated back to the power plant controller or turbine controller as a request for power reduction. The power plant controller and turbine controller can then take the request into account when generating the next set of power references, thereby providing a feedback loop for this element of the control. In this way, the changes defined by the derate factors based on the temperature of components compared with their respective predetermined threshold are propagated throughout the wind power plant 12.

The updated P-Q chart 80 is transmitted to the power reference manager 52, which also receives several power references from various sources. In this respect, the power reference manager 52 includes an input (not shown) that is configured to receive the various power references. The power reference manager 52 further includes a processor 58 that is arranged to analyse the input power references to determine output active and reactive power references, and an output (not shown) configured to transmit those references to the power converter 22, as shall be described.

The references received at the input of the power reference manager 52 include the active and reactive power references received from the power plant controller or turbine controller, along with various internal active power references that together define the auxiliary demand.

The power reference manager 52 also prioritises reactive power over active power or vice-versa in the short-term according to the same prioritisation applied by the power capability manager 54. This entails setting an active or reactive power reference that is outside of the P-Q chart 80 for a short period to meet the prioritised type of demand, as explained in more detail below.

Typically, the power plant controller or turbine controller issues an active power reference indicating the level of real power that the wind power plant 12 must deliver, along with a reactive power reference. As an alternative to a reactive power reference, or in addition to one, the power plant controller or turbine controller may supply a power factor (or 'CosPhi') reference, that defines the ratio of real power to the total power dissipated in the system, or 'apparent power', in which case the power reference manager 52 is responsible for determining a reactive power reference based on the active power reference and the power factor reference. As the skilled person would understand, the reactive power reference can be derived from these inputs using basic geometric and trigonometric relations. The power reference manager 52 may have the option either to calculate the reactive power reference from the power factor and active power references, or to use the reactive power reference supplied by the power plant controller or turbine controller.

The power reference manager 52 compares the power references that it receives with the present capability of the wind turbine generator 1 as indicated by the P-Q chart 80 received from the power capability manager 54, and determines whether the demands to which those references relate can all be met whilst simultaneously supplying adequate reactive power.

If the demands can be met, the power reference manager 52 simply generates active and reactive power references that represent the respective totals of the different active and reactive power references that it receives. If demand cannot be met within the constraints of the P-Q chart 80, the power reference manager 52 prioritises the references that it receives according to a pre-determined regime.

By creating the active and reactive power references based on the various demands arising throughout the system, the power reference manager 52 avoids operating the wind turbine generator 1 at its operational capacity—as indicated by the power capability manager 54—at all times. This in turn increases operational efficiency and reduces the risk of failures due to excessive component temperatures.

In summary, the present invention makes use of the functionality of the thermal capability manager 49 to monitor the temperature of components within the wind power plant 12. This in turn is used to update derate factors that are transmitted to the power management module 52, which are incorporated into degrade factors that define limits on the capability of the converter 22 as defined by the P-Q chart 80. By monitoring several components, the capability manager 49 provides an overall derate for the system of components that are evaluated. This eventually feeds through to the final active and reactive power references that are output by the power reference manager 52 and transferred to the active power controller 46 and reactive power controller 48 accordingly. This in turn feeds back to the turbine controller and thus effects limitation of the generator 20 output as required.

The thermal capability manager 49 of this embodiment can also be used for modelling the effect over time on the power converter or a component forming part of a power converter if the wind turbine generator 1 is operated up to operational limit. In this case, the power converter or a component forming part of a power converter thermal model 62 is used for the purpose of determining the temperature evolution of a component starting from its initial temperature based on notional or perturbed power references. The notional power references define a short-term limit for apparent power produced by the generator 20 outside the normal operating limits defined by the P-Q chart 80. The short-term limit is represented by dashed line 86 in FIG. 7 and relates to operating the wind turbine generator 1 at its operational limit. It can be seen from this figure that the dashed line 86 forms a trapezoidal shape. However, it will be apparent to the skilled reader that the dashed line 86, defining the short-term limit of the wind turbine generator 1, could also form different shapes. Within the apparent power limit, the reactive and active power components can be varied to suit instantaneous priorities. In this context, 'short-term' typically entails a duration of a few minutes at most. Further notional power references, defining a medium-term limit, lying between the normal operating limit 82 and the short-term limit 86, may also be considered but is not presented here. Moreover, numerous short and/or medium-term limits can be continuously evaluated.

The short-term limit is determined according to the duration over which the wind turbine generator 1 can be operated at its operational limit before the temperature of a power converter or a component forming part of a power converter reaches its predetermined threshold.

To this end, the operating point perturber 60 receives input data including the present active and reactive power references, the notional power references defining the operational limit of the wind turbine generator 1, and sample data indicating operating parameters such as voltage and current at various stages of the wind power plant 12, as well as the ambient temperature and the temperature of the component. The notional power references can either be fixed or commanded/adjusted online.

The component circuit model 67 simulates a set of voltages across and currents thorough the component based on the input data received from the operating point perturber 60 relating to the present power references and the notional power references.

Once the voltages and currents have been determined, they are in turn used as inputs for the component loss model 68, which is configured to determine the associated power dissipated by the component. The dissipated power is then used, together with an ambient temperature of the component, as inputs for the thermal model 70, which determines the temperature evolution of the component at the current power references and at the notional power references.

Figure 8:
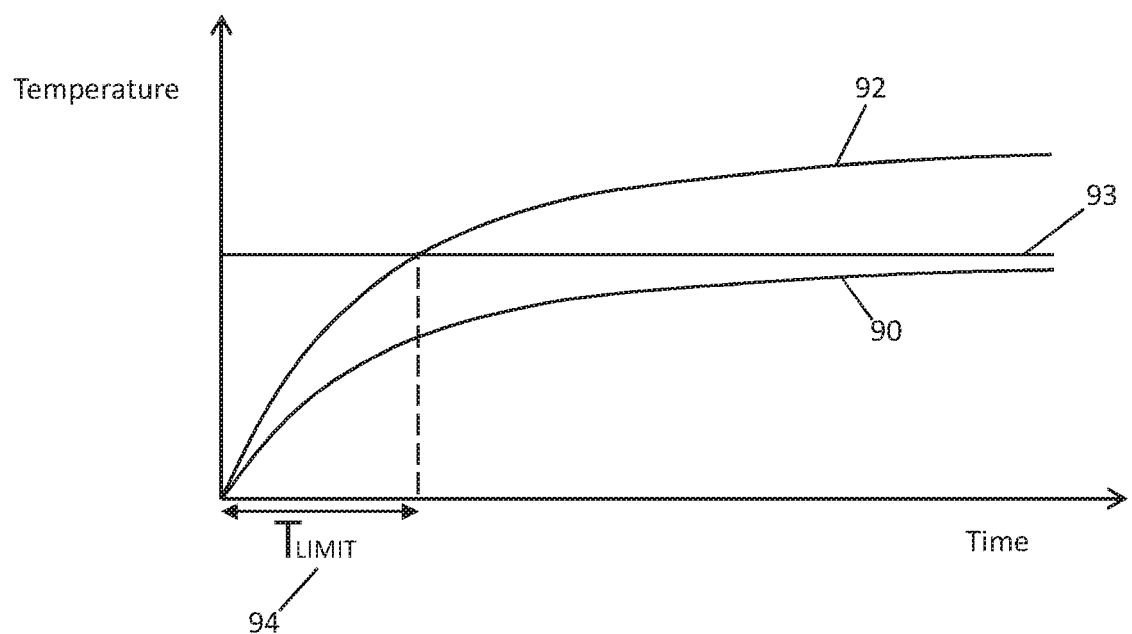
FIG. 8 is a graph illustrating the evolution of the temperature of a component using the component thermal model of FIG. 5.

FIG. 8 shows two examples of the temperature evolution of a component, one example based on current power references, indicted by line 90, and another example based on notional power references, represented by line 92. Horizontal line 93 indicates a predefined threshold of the component. In this embodiment, the predefined threshold is the operational temperature of the component, but it could also relate to the component temperature limit. It can be seen from this figure that the wind turbine generator 1 could be operated at the current power references indefinitely without the temperature of the component reaching its operational temperature limit. However, line 92 indicates that the wind turbine generator 1 could only operate at the notional power references for a finite period, denoted by $T_{LIMIT}$, before the temperature of the component reaches its limit or thermal capacity. In this instance, $T_{LIMIT}$ corresponds to the short-term limit for apparent power produced by the generator 20 outside the normal operating limits defined by the P-Q chart 80. That is, $T_{LIMIT}$ corresponds to short-term limit for operating the generator 20 at the inputted notional power references. Several short-term limits can be calculated for different notional power references.

The converter capability evaluator 64 calculates $T_{LIMIT}$, which is then passed to the power management module 50. The power management module 50 then uses $T_{LIMIT}$ to update active and reactive power references that are used to control operation of the converter 22 and the generator 20 as described above. That is, $T_{LIMIT}$ is communicated to the power plant controller or the wind turbine generator controller in order to establish the thermal capacity of the component.

For example, if the power reference manager 52 determines that the essential services cannot be sustained whilst also supplying some power to the grid, it can provide short-term boosting by prioritising active power over reactive power. In other words, if the active power demands of the essential services and the grid exceed the active power that the P-Q chart 80 indicates can be supplied, the power reference manager 52 increases the active power reference beyond the normal P-Q chart limit, and decreases the reactive power reference accordingly within the constraints of the total electrical power that the generator 20 can produce.

In another scenario, if reactive power is prioritised by the power plant controller or turbine controller for enhanced stability, the power reference manager 52 increases the reactive power reference outside of the P-Q chart 80 for a short time, within the boundaries defined by the short-term apparent power limit 86.

This illustrates that the power reference manager 52 provides a boosting function to enable active and/or reactive power to be supplied to the grid in the short-term, for example when local wind speed is low and so the generating capability of the wind turbine generator 1 is curtailed. In this way, the power reference manager 52 makes it possible for the wind turbine generator 1 to operate at its maximum generating potential for short periods in a safe manner.

As mentioned above, numerous short and/or medium-term limits can be continuously evaluated. This means that the calculation of $T_{LIMIT}$ is iterative and is updated according to information from the previous iteration. Thus, if the short-term thermal capacity of a component has been used, then the $T_{LIMIT}$ will decrease to zero. $T_{LIMIT}$ will then increase while the component cools. The decrease of $T_{LIMIT}$ is actually what allows for short term operation outside normal F-Q chart 80 while still ensuring that the component does not reach or exceed its operational limit.

In the long-term, the normal or derated limits 80, 84 determined by the power capability manager 54 must be adhered to so that the wind turbine generator 1 does not operate outside of its intended range for long periods, to avoid prolonged thermal stress within the wind turbine generator 1, which could lead to wear or failure as mentioned above. So, whenever the power reference manager 52 determines that the demands for active and reactive power made by the power plant controller or the turbine controller can be met whilst operating within the normal P-Q chart 80 defined by the power capability manager 54 and whilst also satisfying the present prioritisation between active and reactive power, the power reference manager 52 calculates active and reactive power references for the respective controllers that fall within those limits. If power cannot be supplied to the grid without operating outside the P-Q chart 80 for a longer period, the wind power plant 12 must be shut down until generating capacity become sufficient for stable operation.

As already noted, embodiments of invention are also applicable to other types of wind turbine system, including DFIG topologies having a doubly fed induction generator with a rotor-connected converter. Although the skilled person will be familiar with such arrangements, for completeness FIG. 9 shows in overview an example of a wind power plant 81 having such an architecture.

Figure 9:
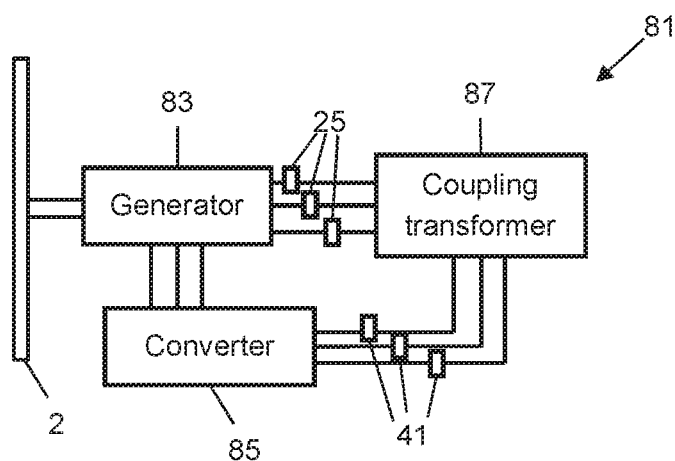
FIG. 9 is a schematic block diagram of an architecture of a DFIG arrangement that is suitable for use with embodiments of the invention.

The wind power plant 81 of FIG. 9 has a generator 83 comprising a set of rotor windings that are driven by the rotor 2, and a set of stator windings. To enable the generator 83 to produce electrical power when the rotor windings rotate, an excitation current is fed to the rotor windings by a power converter 85.

The output of the generator 83 is connected to a three-way coupling transformer 87 that provides electrical connection to a point of common coupling (not shown) to a grid, and to the power converter 85. In turn, the power converter 85 is connected to the rotor windings of the generator 83, thereby defining a feedback loop. Thus, once power generation commences, the power converter 85 can use the output of the generator 83 to produce the excitation current that is delivered to the rotor windings.

In summary, the power management module 50 of this embodiment separates the power management of the wind turbine generator 1 into two distinct categories, namely long-term power management for stable operation, and short-term power management for temporary boosting of active power and/or reactive power when required.

The skilled person will appreciate that modifications may be made to the specific embodiments described above without departing from the inventive concept as defined by the claims.

The invention claimed is:

1. A method for use in controlling a wind turbine generator of a wind power plant based on a condition of a power converter or a component forming part of a power converter in the wind power plant, the method comprising:
   determining an initial condition of the component;
   determining an evolution of the condition from the initial condition based on notional power reference values of the wind turbine generator;
   comparing the evolution of the condition to a predetermined threshold;
   determining, from comparing the evolution of the condition to the predetermined threshold, a time period by which the condition of the component will substantially equal the predetermined threshold;
   boosting at least one of active power production or reactive power production of the wind turbine generator during at least a portion of the time period;
   determining a first derate factor for active power and a second derate factor for reactive power;
   determining a degrade factor to be applied to the component based on the first and second derate factors;
   determining, based on the degrade factor, an active power limit and a reactive power limit while prioritizing between active power and reactive power;
   determining an active power reference and a reactive power reference that satisfy the active power limit and the reactive power limit; and
   controlling the wind turbine generator using the active power reference and the reactive power reference such that the condition of the component does not meet the predetermined threshold during and after the time period.

2. The method of claim 1, further comprising controlling the wind turbine generator at the notional power reference values for a duration not exceeding the time period.

3. The method of claim 1, wherein the condition of the component is a temperature of the component.

4. The method of claim 3, wherein the initial condition is determined as a non-linear function based on a power loss of the component at current operating parameters and an ambient temperature.

5. The method of claim 3, wherein the evolution is determined as a non-linear function based on a power loss of the component at the notional power reference values and an ambient temperature.

6. The method of claim 4, wherein the power loss of the component is determined based on a voltage across the component and a current through the component.

7. The method of claim 1 when applied to a plurality of components, further comprising selecting, from a plurality of time periods, a shortest time period as the time period.

8. The method of claim 1, further comprising:
   comparing the initial condition of the component to the predetermined threshold; and,
   modifying power reference values of the wind turbine generator if the condition substantially equals or exceeds the predetermined threshold.

9. A controller for a wind turbine generator of a wind power plant, comprising:
   one or more processors; and
   a memory module communicatively connected to the one or more processors, wherein the memory module comprises a set of program code instructions which when executed by the one or more processors implement an operation for controlling the wind turbine generator based on a condition of a power converter or a component forming part of a power converter in the wind power plant, the operation comprising:
      determining an initial condition of the component;
      determining an evolution of the condition from the initial condition based on notional power reference values of the wind turbine generator;
      comparing the evolution of the condition to a predetermined threshold; and
      determining, from comparing the evolution of the condition to the predetermined threshold, a time period by which the condition of the component will substantially equal the predetermined threshold;
      boosting at least one of active power production or reactive power production of the wind turbine generator during at least a portion of the time period;
      determining a first derate factor for active power and a second derate factor for reactive power;
      determining a degrade factor to be applied to the component based on the first and second derate factors;
      determining, based on the degrade factor, an active power limit and a reactive power limit while prioritizing between active power and reactive power;
      determining an active power reference and a reactive power reference that satisfy the active power limit and the reactive power limit; and
      controlling the wind turbine generator using the active power reference and the reactive power reference such that the condition of the component does not meet the predetermined threshold during and after the time period.

10. A wind turbine, comprising:
   a tower;
   a nacelle disposed on the tower;
   a generator disposed in the nacelle;
   a controller configured to perform an operation for controlling the generator based on a condition of a power converter or a component forming part of a power converter in a wind power plant, the operation comprising:

determining an initial condition of the component;
determining an evolution of the condition from the initial condition based on notional power reference values of the wind turbine generator;
comparing the evolution of the condition to a predetermined threshold; and
determining, from comparing the evolution of the condition to the predetermined threshold, a time period by which the condition of the component will substantially equal the predetermined threshold;
boosting at least one of active power production or reactive power production of the generator during at least a portion of the time period;
determining a first derate factor for active power and a second derate factor for reactive power;
determining a degrade factor to be applied to the component based on the first and second derate factors;
determining, based on the degrade factor, an active power limit and a reactive power limit while prioritizing between active power and reactive power;
determining an active power reference and a reactive power reference that satisfy the active power limit and the reactive power limit; and
controlling the generator using the active power reference and the reactive power reference such that the condition of the component does not meet the predetermined threshold during and after the time period.

* * * * *